(12) United States Patent
Biskeborn et al.

(10) Patent No.: US 10,930,306 B1
(45) Date of Patent: Feb. 23, 2021

(54) MAGNETIC MEASUREMENT OF HEAD SPAN SPACING

(71) Applicant: International Business Machines Corporation, Armonk, NY (US)

(72) Inventors: Robert Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/681,650

(22) Filed: Nov. 12, 2019

(51) Int. Cl.
*G11B 5/455* (2006.01)
*G11B 5/008* (2006.01)
*G11B 5/187* (2006.01)
*G11B 5/584* (2006.01)
*G11B 5/29* (2006.01)
*G11B 5/48* (2006.01)
*G11B 5/55* (2006.01)
*G11B 5/31* (2006.01)

(52) U.S. Cl.
CPC .......... *G11B 5/00813* (2013.01); *G11B 5/187* (2013.01); *G11B 5/29* (2013.01); *G11B 5/455* (2013.01); *G11B 5/4893* (2013.01); *G11B 5/55* (2013.01); *G11B 5/584* (2013.01); *G11B 5/313* (2013.01)

(58) Field of Classification Search
CPC ...................................................... G11B 5/455
See application file for complete search history.

(56) References Cited

U.S. PATENT DOCUMENTS

| | | | |
|---|---|---|---|
| 5,796,562 A * | 8/1998 | Draaisma | G11B 5/3103 360/121 |
| 6,275,350 B1 | 8/2001 | Barndt | |
| 6,442,004 B1 * | 8/2002 | Heinz | G11B 5/5521 360/291 |
| 7,054,093 B1 * | 5/2006 | Anderson | G11B 5/00826 360/75 |
| 7,529,060 B2 | 5/2009 | Simmons, Jr. et al. | |
| 7,791,834 B2 * | 9/2010 | Biskeborn | G11B 5/00826 360/121 |
| 8,315,013 B2 * | 11/2012 | Biskeborn | G11B 5/17 360/119.01 |

(Continued)

FOREIGN PATENT DOCUMENTS

WO    9705603  A1    2/1997

OTHER PUBLICATIONS

Argumedo et al., "Scaling tape-recording areal densities to 100 Gb/in2," IBM Journal of Research and Development, vol. 52, No. 4/5, Jul./Sep. 2008, pp. 513-527.

*Primary Examiner* — Jefferson A Evans
(74) *Attorney, Agent, or Firm* — Zilka-Kotab, P.C.

(57) ABSTRACT

An apparatus, according to one embodiment, includes at least two write transducers positioned a predefined distance apart in a first direction. Outer surfaces of pole tips of the write transducers are substantially coplanar. Write gaps are defined between the pole tips of the write transducers. Planes of the write gaps are oriented substantially perpendicular to the first direction. Coils are positioned to create flux in a magnetic yoke of each write transducer upon energization thereof. The apparatus also includes a mechanism for assisting in orienting a module having two or more sensors of interest relative to the write gaps.

19 Claims, 15 Drawing Sheets

(56) References Cited

U.S. PATENT DOCUMENTS

| | | | | |
|---|---|---|---|---|
| 8,358,486 | B2* | 1/2013 | Biskeborn | G11B 5/0083 360/121 |
| 8,385,018 | B2* | 2/2013 | Biskeborn | G11B 5/23 360/121 |
| 8,526,138 | B2* | 9/2013 | Biskeborn | G11B 5/00826 360/121 |
| 8,724,247 | B2 | 5/2014 | Poorman et al. | |
| 9,177,580 | B1 | 11/2015 | Vanderheyden et al. | |
| 9,280,988 | B1 | 3/2016 | Lakshmikumaran et al. | |
| 9,892,751 | B1* | 2/2018 | Harper | G11B 5/265 |
| 2005/0201017 | A1* | 9/2005 | Koga | G11B 5/584 360/291 |
| 2007/0109682 | A1* | 5/2007 | Ozue | G11B 5/534 360/125.39 |
| 2008/0198506 | A1* | 8/2008 | Weng | G11B 5/5504 360/101 |
| 2008/0266705 | A1* | 10/2008 | Saliba | G11B 5/584 360/31 |
| 2009/0231752 | A1* | 9/2009 | Kudo | G11B 15/62 360/75 |
| 2009/0257143 | A1* | 10/2009 | Hachisuka | G11B 5/6064 360/75 |
| 2010/0214688 | A1* | 8/2010 | Biskeborn | G11B 5/584 360/77.12 |
| 2014/0268408 | A1* | 9/2014 | Yeakley | G11B 5/584 360/76 |
| 2015/0187379 | A1* | 7/2015 | Biskeborn | G11B 5/4893 360/75 |

\* cited by examiner

MAGNETIC MEASUREMENT OF HEAD SPAN SPACING

BACKGROUND

The present invention relates to data storage systems, and more particularly, this invention relates to magnetic measurement of head span.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

Various problems are associated with differences in spans among heads in a large population of magnetic recording modules. One problem introduced by different head spans among a plurality of heads is misplacement of tracks resulting from writing a tape in one drive and then write appending that same tape in another drive where the heads in the two drives have different spans. Another problem occurs when the differences in head spans causes the data to become unreadable.

SUMMARY

An apparatus, according to one embodiment, includes at least two write transducers positioned a predefined distance apart in a first direction. Outer surfaces of pole tips of the write transducers are substantially coplanar. Write gaps are defined between the pole tips of the write transducers. Planes of the write gaps are oriented substantially perpendicular to the first direction. Coils are positioned to create flux in a magnetic yoke of each write transducer upon energization thereof. The apparatus also includes a mechanism for assisting in orienting a module having two or more sensors of interest relative to the write gaps.

An apparatus, according to another embodiment, includes at least two magnetic bars positioned a predefined distance apart in a first direction, an axis of each magnetic bar being defined along an elongated outer surface thereof between distal ends of the respective magnetic bar. Outer surfaces of the magnetic bars are substantially coplanar. Axes of the magnetic bars are oriented substantially perpendicular to the first direction. The apparatus also includes a mechanism for assisting in orienting a module having two or more sensors across the magnetic bars in the first direction.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes at least two write transducers positioned a predefined distance apart in a first direction. Outer surfaces of pole tips of the write transducers are substantially coplanar. Write gaps are defined between the pole tips of the write transducers. Planes of the write gaps are oriented substantially perpendicular to the first direction. Coils are positioned to create flux in a magnetic yoke of each write transducer upon energization thereof. The apparatus also includes a mechanism for assisting in orienting a module having two or more sensors of interest relative to the write gaps.

In another general embodiment, an apparatus includes at least two magnetic bars positioned a predefined distance apart in a first direction, an axis of each magnetic bar being defined along an elongated outer surface thereof between distal ends of the respective magnetic bar. Outer surfaces of the magnetic bars are substantially coplanar. Axes of the magnetic bars are oriented substantially perpendicular to the first direction. The apparatus also includes a mechanism for assisting in orienting a module having two or more sensors across the magnetic bars in the first direction.

Figure 1A:
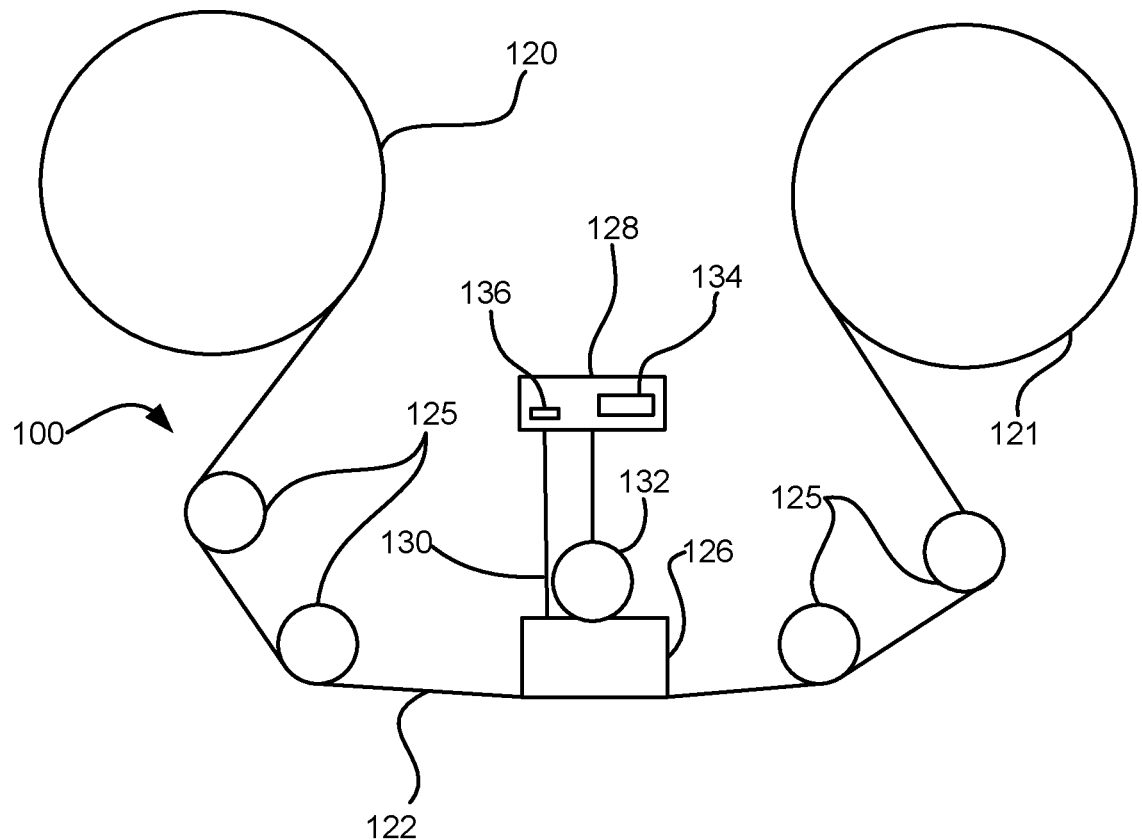
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, write transducers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
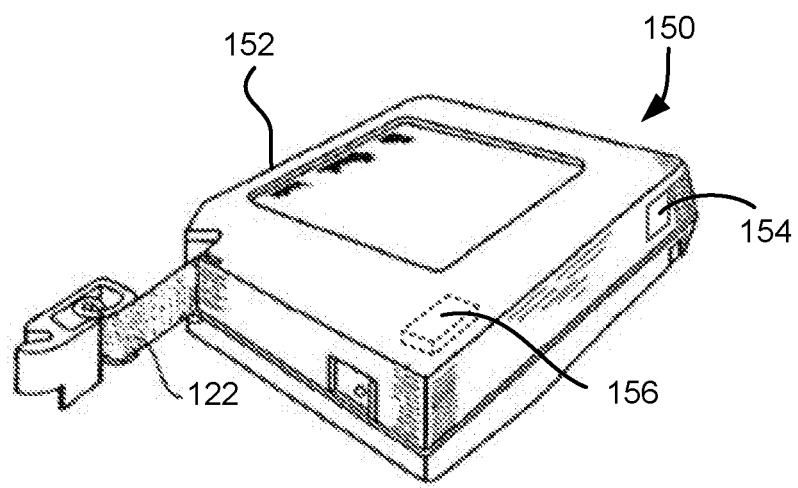
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
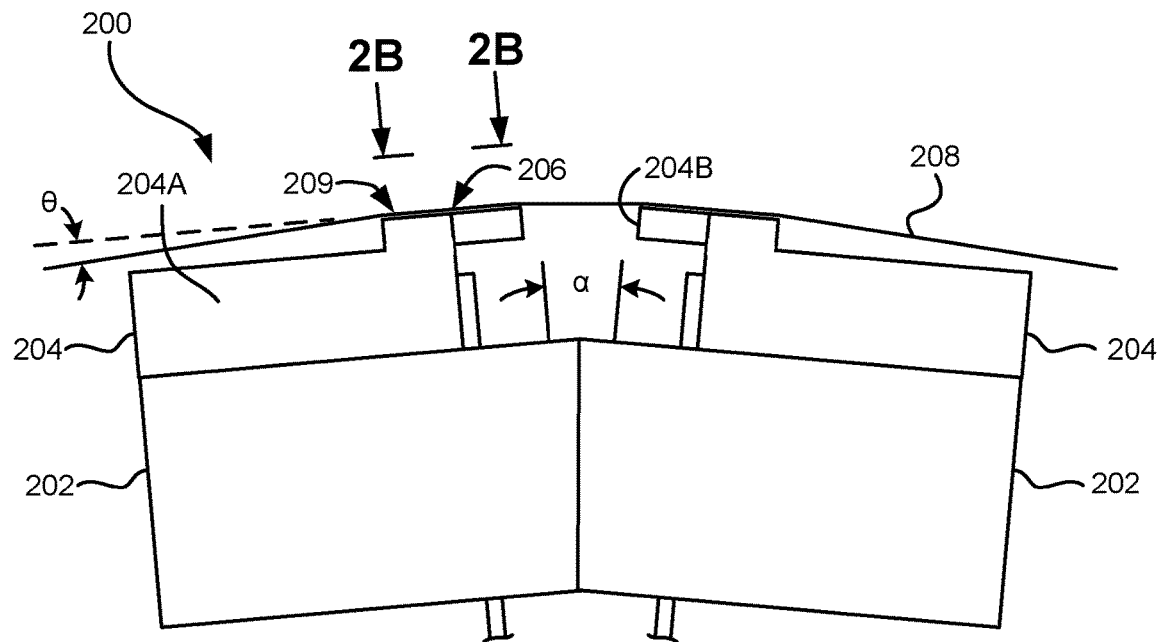
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or write transducers 206 are formed. In use, a tape 208 is moved over the modules 204 along a media (tape) bearing surface 209 in the manner shown for reading and writing data on the tape 208 using the readers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and write transducers may be arranged in a piggyback or merged configuration. An illustrative piggybacked configuration comprises a (magnetically inductive) write transducer on top of (or below) a (magnetically shielded) reader transducer (e.g., a magnetoresistive reader, etc.), wherein the poles of the write transducer and the shields of the reader are generally separated. An illustrative merged configuration comprises one reader shield in the same physical layer as one writer pole (hence, "merged"). The readers and write transducers may also be arranged in an interleaved configuration. Alternatively, each array of channels may be readers or write transducers only. Any of these arrays may contain one or more servo track readers for reading servo data on the medium.

Figure 2B:
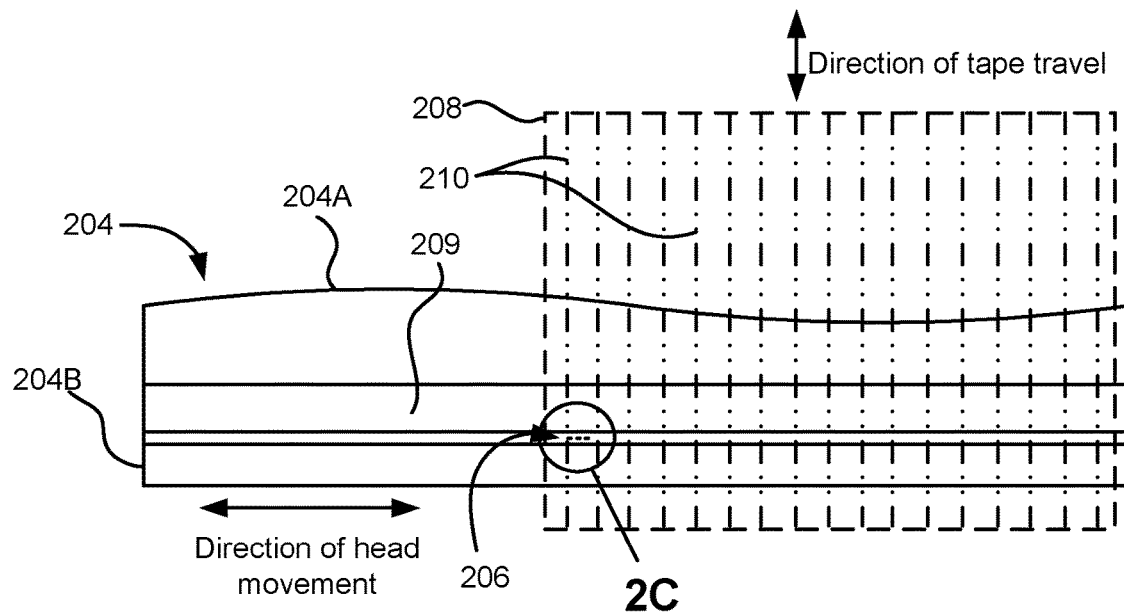
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or write transducers 206 are positioned to specific track positions within one of the data bands. Outer readers, sometimes called servo readers, read the servo tracks 210. The servo signals are in turn used to keep the readers and/or write transducers 206 aligned with a particular set of tracks during the read/write operations.

Figure 2C:
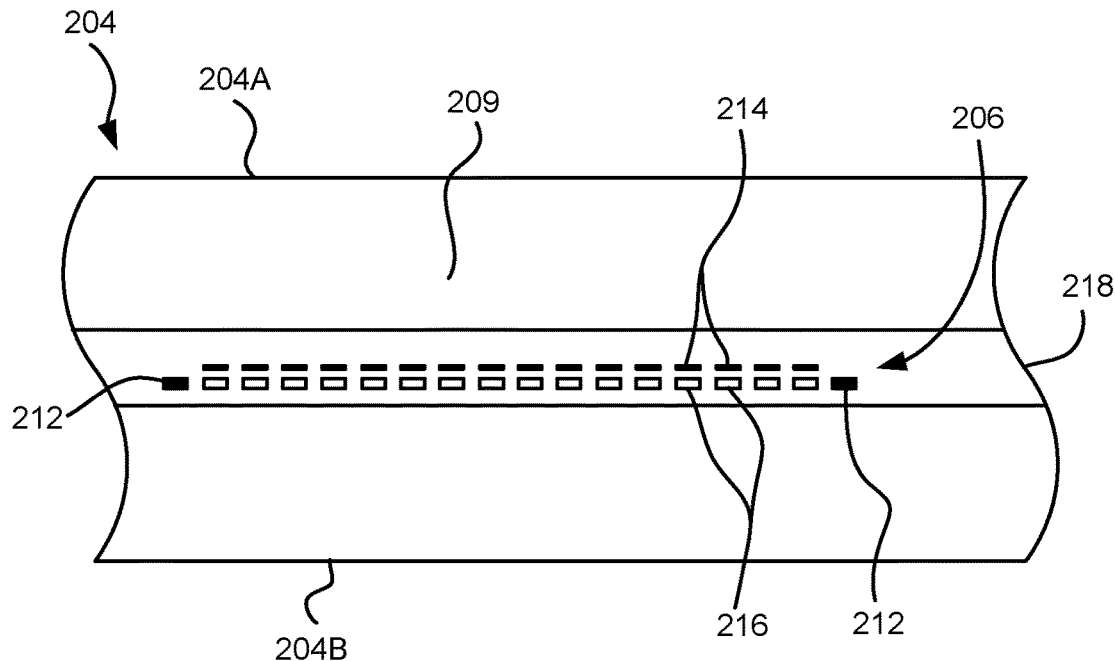
FIG. 2C is a detailed view taken from Circle 2C of FIG. 2B.

FIG. 2C depicts a plurality of readers and/or write transducers 206 formed in a gap 218 on the module 204 in Circle 2C of FIG. 2B. As shown, the array of readers and write transducers 206 includes, for example, 16 write transducers 214, 16 readers 216 and two servo readers 212, though the number of elements may vary. Illustrative embodiments include 8, 16, 32, 40, and 64 active readers and/or write transducers 206 per array, and alternatively interleaved designs having odd numbers of reader or write transducers such as 17, 25, 33, etc. An illustrative embodiment includes 32 readers per array and/or 32 write transducers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and write transducers may be arranged in a piggyback configuration as shown in FIG. 2C, the readers 216 and write transducers 214 may also be arranged in an interleaved configuration. Alternatively, each array of readers and/or write transducers 206 may be readers or write transducers only, and the arrays may contain one or more servo readers 212. As noted by considering FIGS. 2A and 2B-2C together, each module 204 may include a complementary set of readers and/or write transducers 206 for such things as bi-directional reading and writing, read-while-write capability, backward compatibility, etc.

Figure 2D:
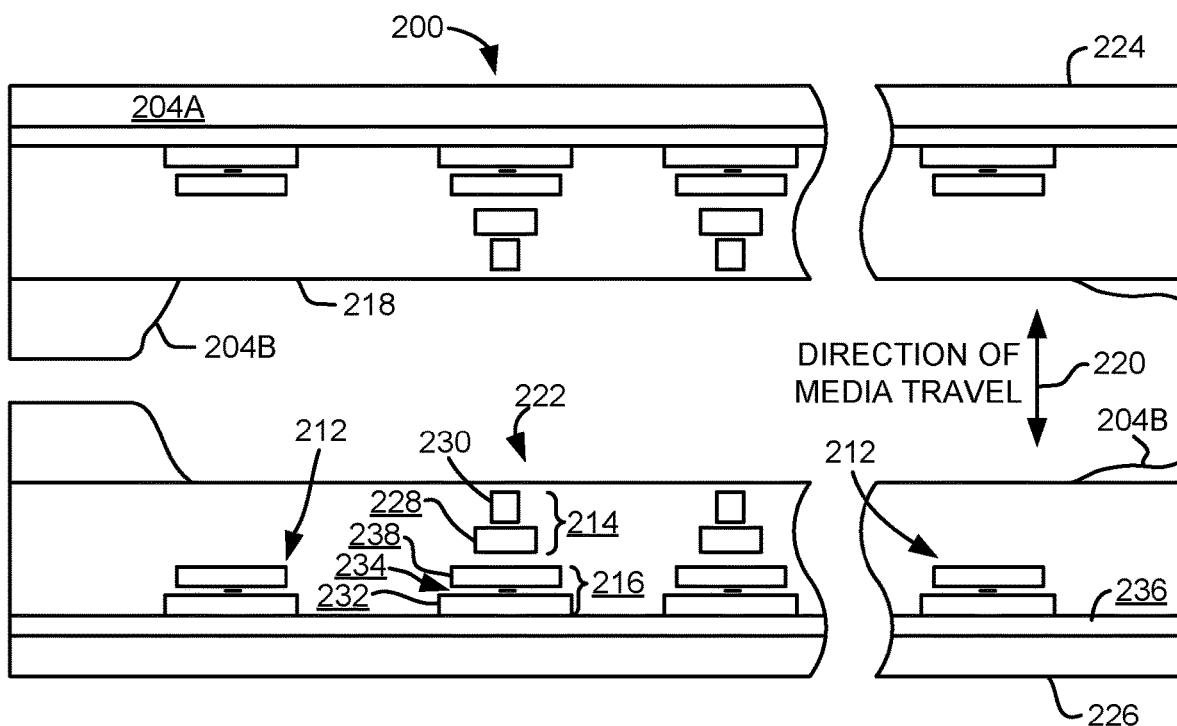
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The write transducers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and reader of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
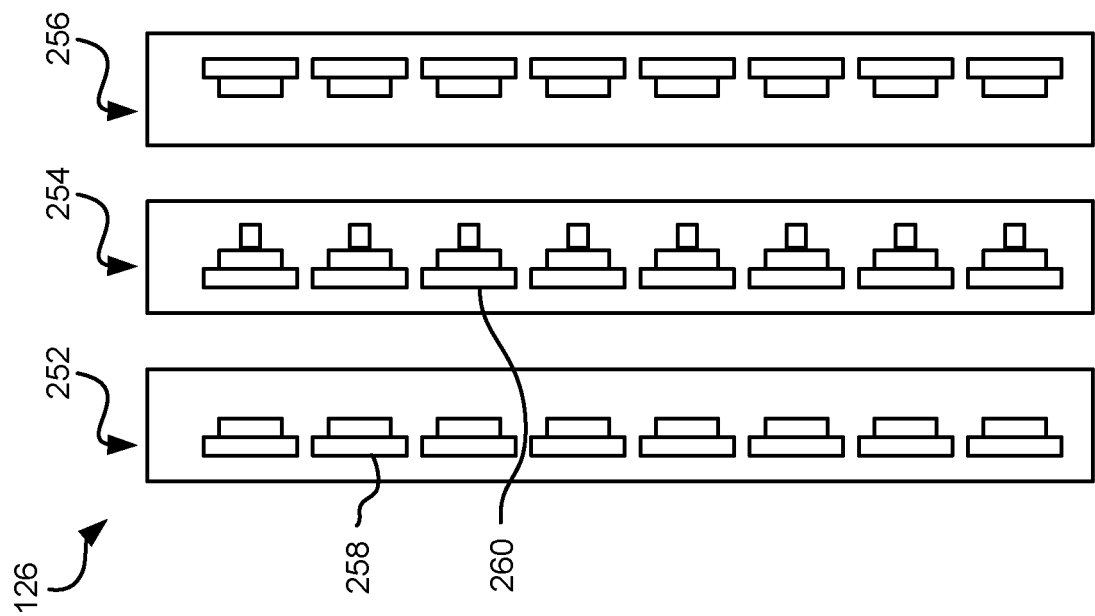
FIG. 4 is a partial tape bearing surface view of a magnetic head having a read-write-read configuration.
Figure 3:
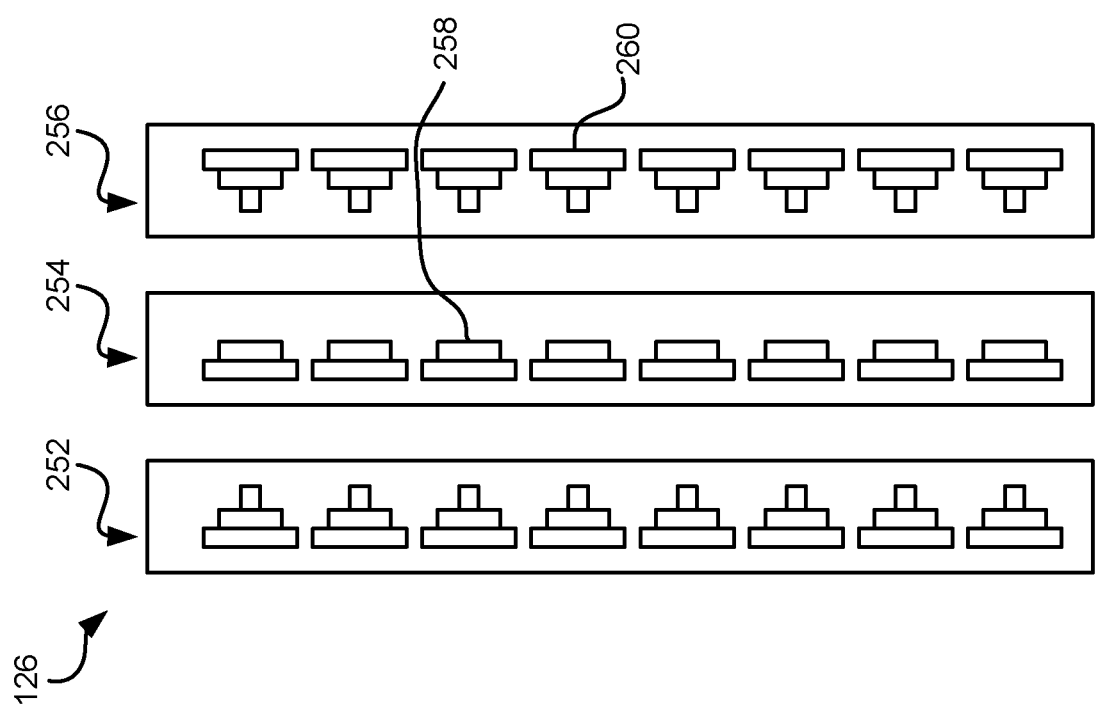
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
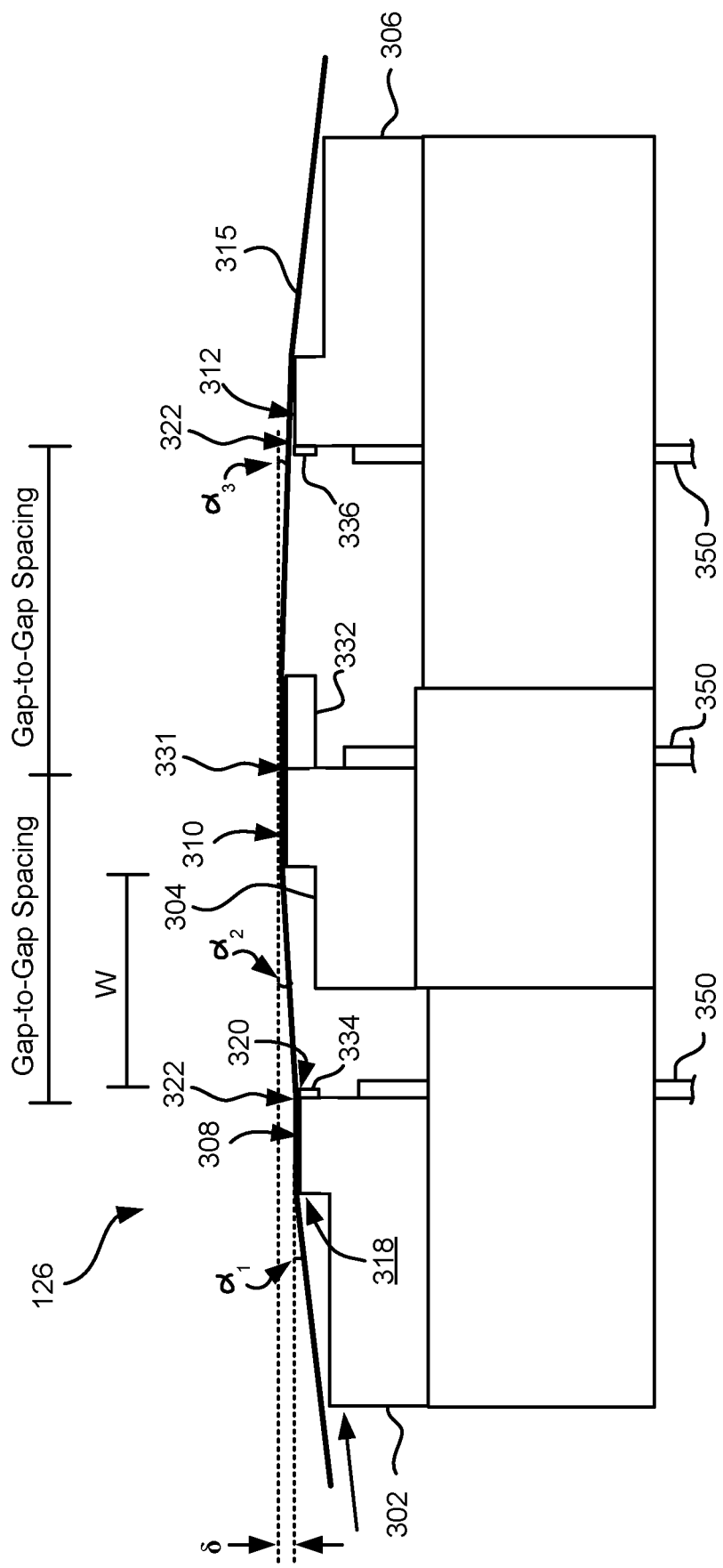
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". Accordingly, a tape bearing surface is synonymous with the outer surface of the described object that faces the intended location of the tape, medium, or other object worked upon.

The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
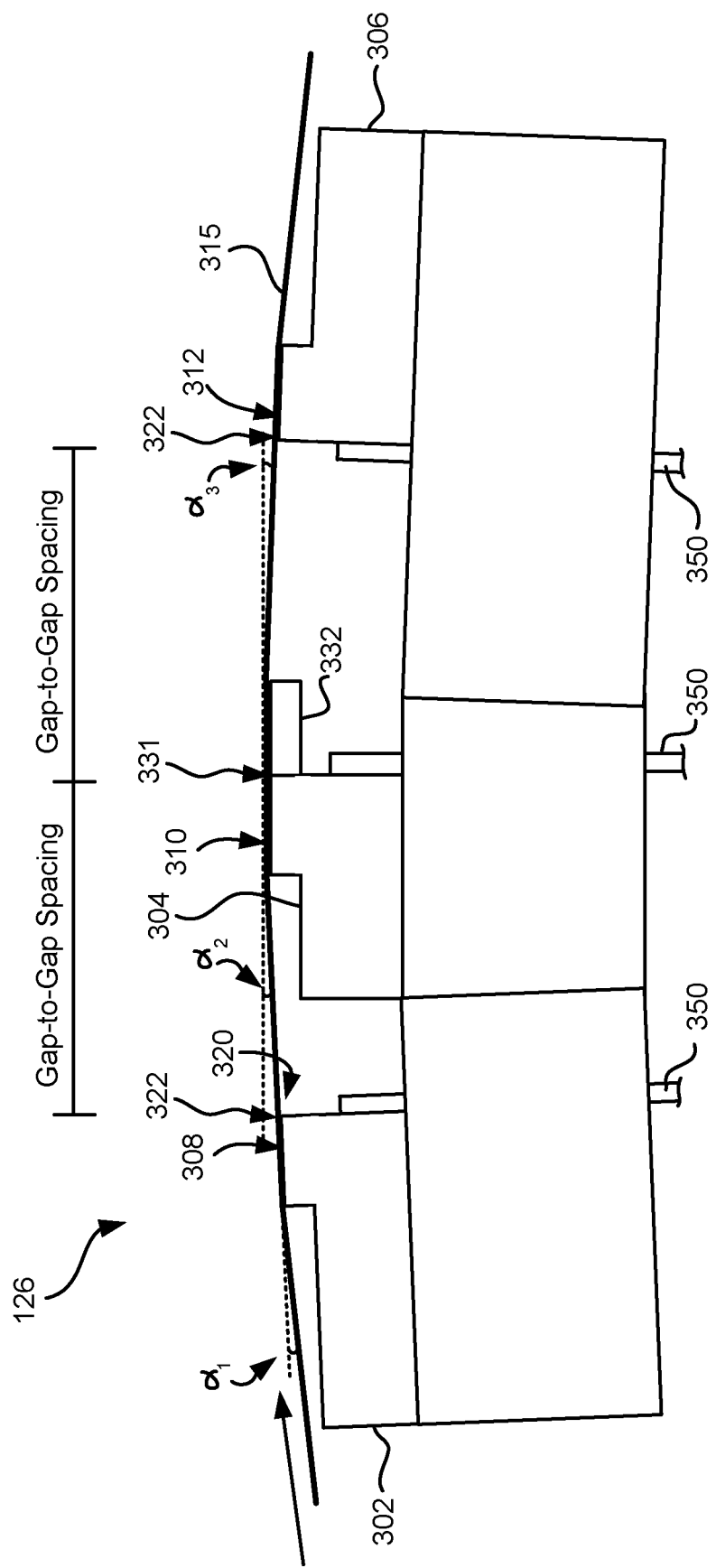
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data readers, with the exception that the outer modules 302, 306 may include optional servo readers. The servo readers may be used to position the head during reading and/or writing operations. The servo reader(s) on each module are typically located towards the end of the array of readers or write transducers.

By having only readers or side by side write transducers and servo readers in the gap between the substrate and closure, the gap length can be substantially reduced. Typical heads have piggybacked readers and write transducers, where the write transducer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
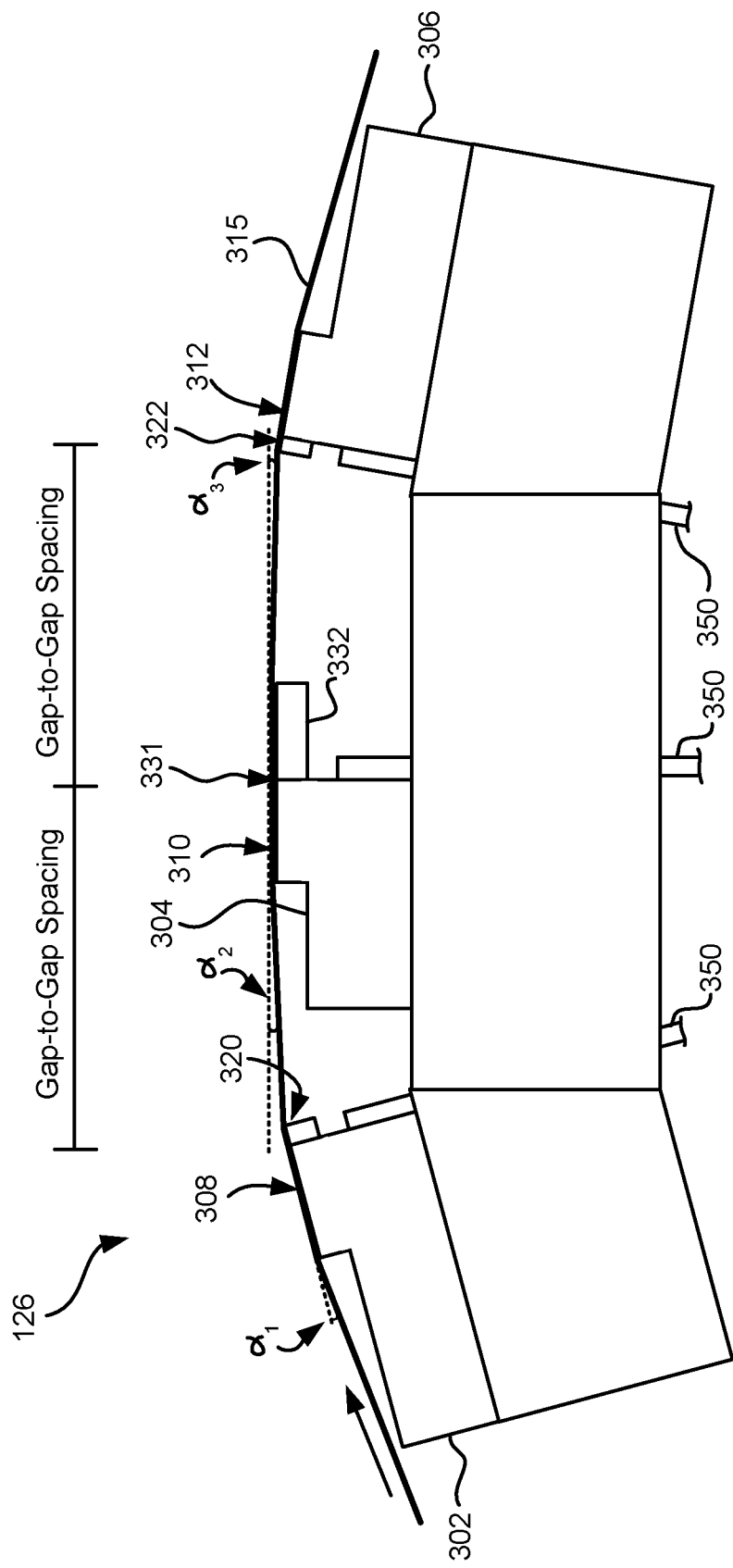
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
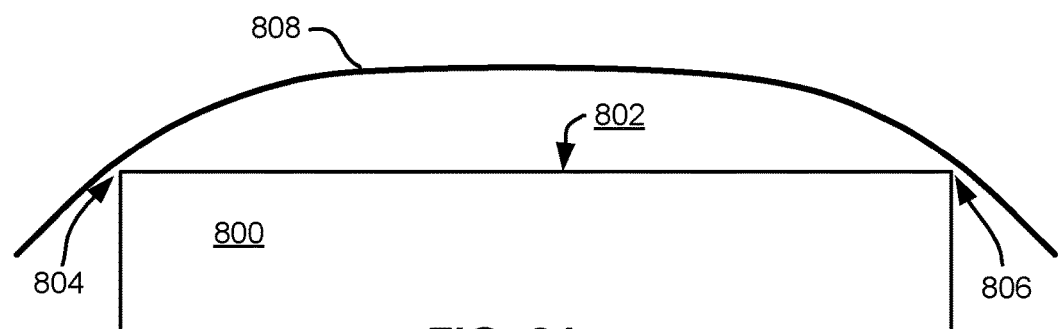
FIGS. 8A-8C are schematics depicting the principles of tape tenting.
Figure 8B:
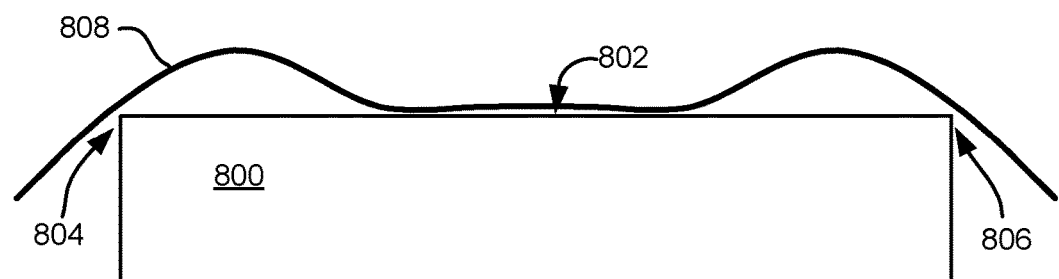
Figure 8C:
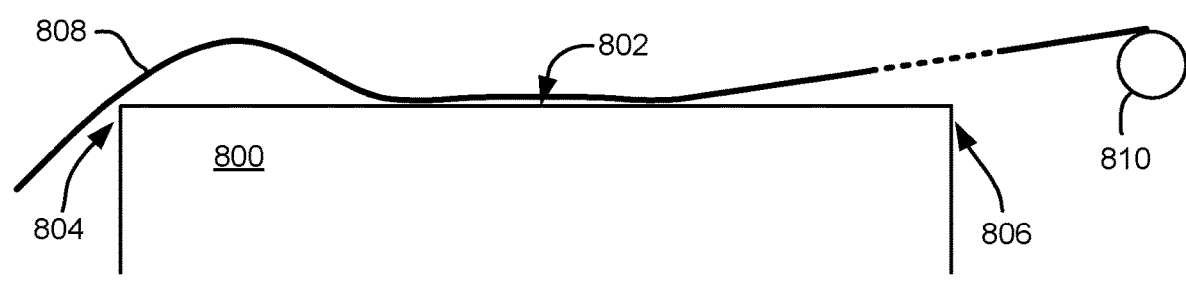

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
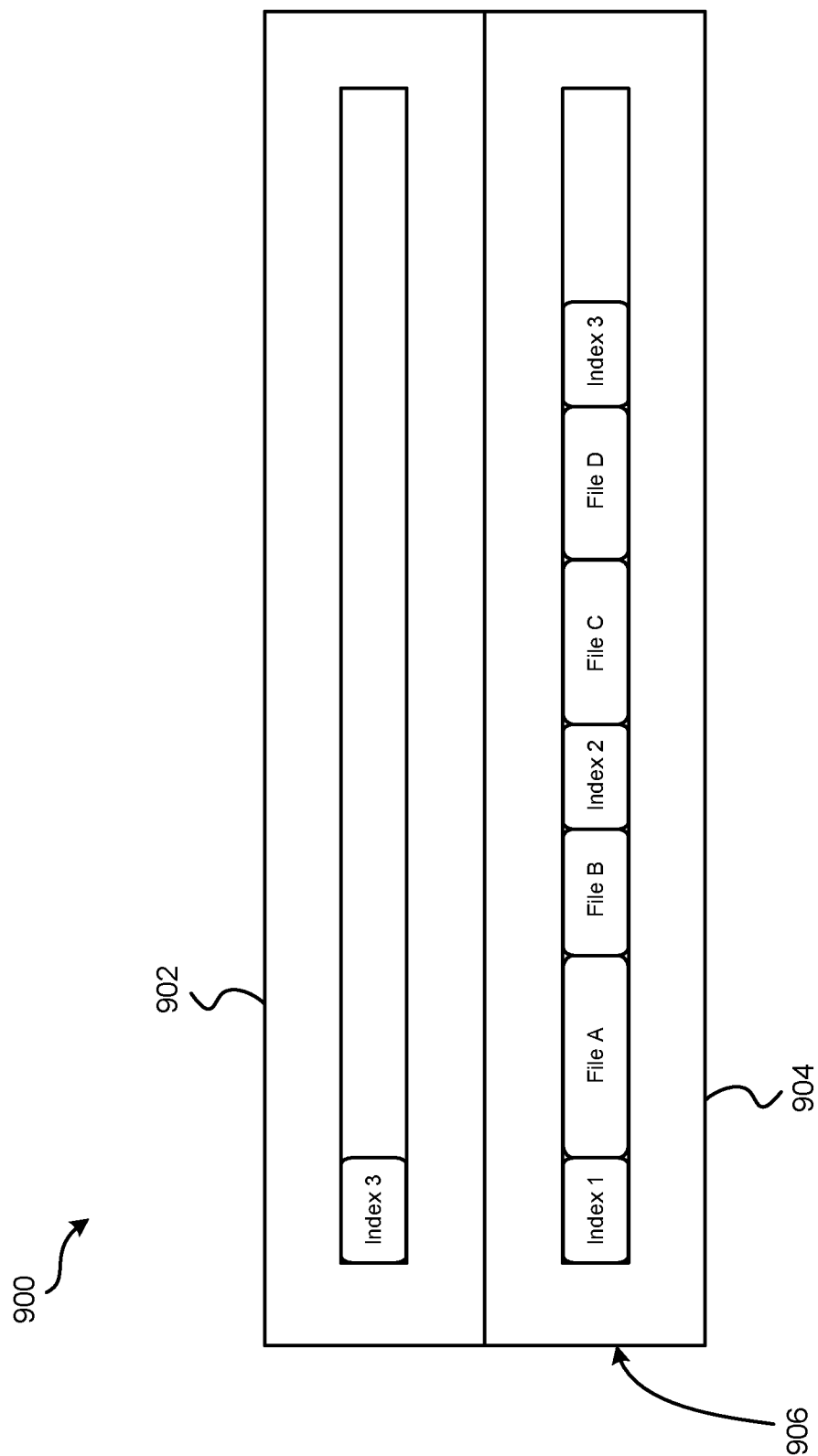
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, a continuing goal of the data storage industry is to improve data density, such as by reducing track width. However, limitations in head manufacturing result in variation in transducer span from head-to-head, thereby leading to limits of areal density due to the resulting misplacement of tracks, and/or variations in track pitch from head to head, during writing. Moreover, such misplacement/ variations of written tracks present future repercussions in that it affects reading such data. Thus, the variation of span between transducers from head-to-head is a serious problem. For instance, even though manufactured to exacting specifications on a single wafer, head span between outermost transducers can vary from head-to-head by as much as 600 nanometers (nm) or more in current generation LTO heads that are designed for writing and reading one-half inch, 4 data band magnetic recording tapes.

One conventional technique for measuring head span involves attempting to discern servo head spacing by reading servo patterns on magnetic tape. These techniques may be difficult to implement and/or time consuming during production. Moreover, such techniques rely on the lateral dimensional stability of the tape, which itself is susceptible to dimensional changes due to factors such as humidity, temperature and tension.

Various embodiments described herein include an apparatus and method that enable accurately determining head span of a module and/or cabled module. Heads which do not meet a specified head span may be considered dispositioned and may be removed from production. Conversely, heads which do meet a specified head span may be used in production, thereby avoiding issues which arise from the misplacement of written tracks.

In various embodiments, the head span is the length between particular transducers of an array of transducers. The span may be measured between any two selected transducers, e.g., data readers and/or servo readers. In one approach, the span is the length between a first servo reader and a second servo reader measured in a direction parallel to the array of transducers. For example, the span is the length between servo 1 and servo 2 in a direction parallel to the array of transducers. A module may have 2, 3, 4, etc., servo readers in an array of transducers. In one approach, the span is the length between a second of the servo readers and a third of the servo readers in a direction parallel to the array of transducers. In another approach, the span is the length between innermost servo transducers positioned at each end of the array, e.g., in an approach having multiple servo readers at each end of the array. In a further approach, the span is the length between outermost transducers positioned at each end of the array. In yet a further approach, the span is the length between outermost data reader transducers positioned toward outer ends of the array.

Figure 10:
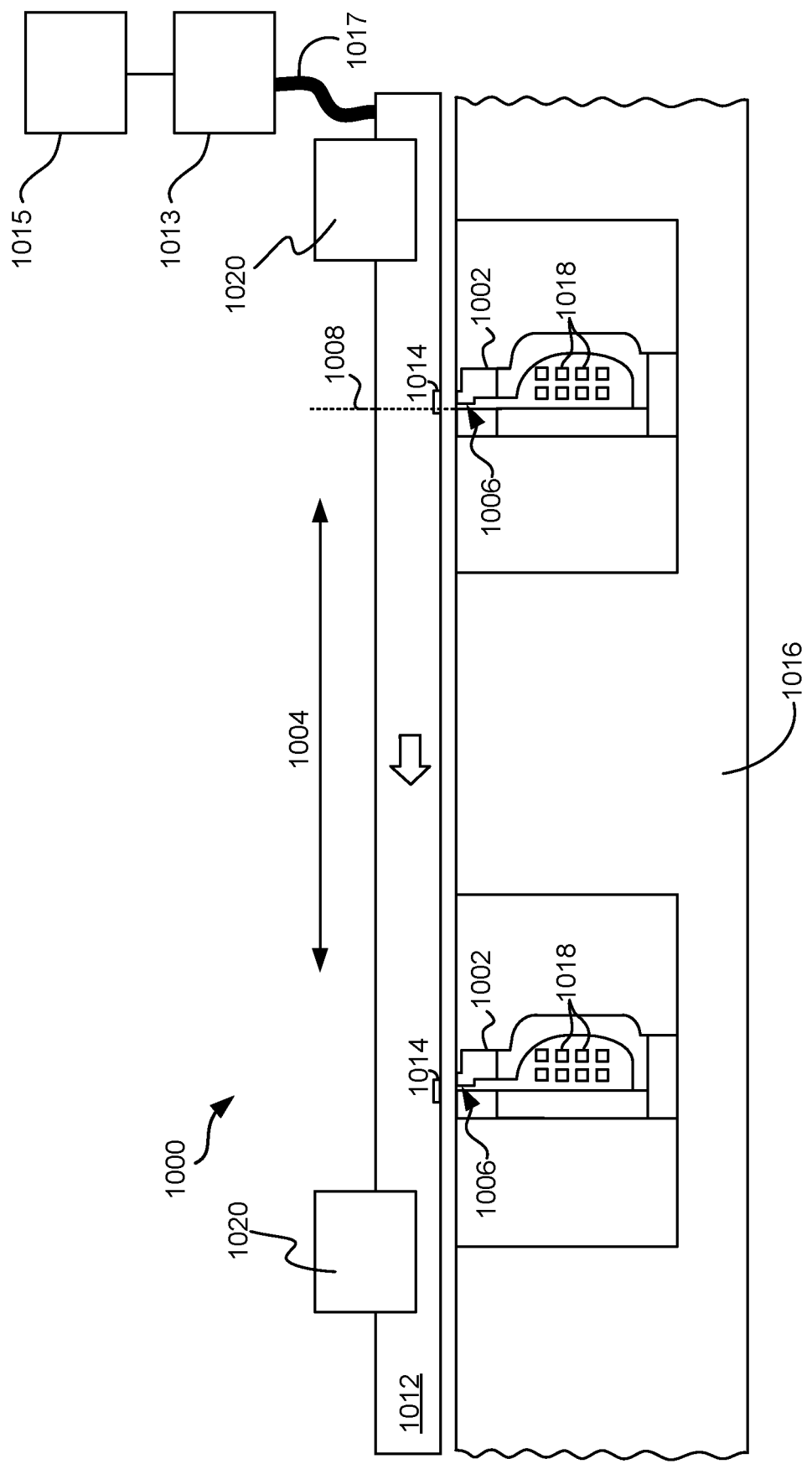
FIG. 10 is a representational diagram of an apparatus, in accordance with one embodiment of the present invention.

FIG. 10 illustrates an apparatus 1000 and the relative translation between the apparatus 1000 and a module 1012, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

In a preferred embodiment, the apparatus 1000 comprises at least two write transducers 1002. Equivalently, the apparatus 1000 may comprise at least two of any type and/or combination of magnetic field generator including, but not limited to, direct current (DC) generators, alternating current (AC) generators, electromagnetic field (EMF) generators, etc. In one embodiment, the write transducers 1002 may be cabled write transducers. In various approaches, the at least two write transducers are formed on a single substrate. In other approaches, the at least two write transducers are on separate modules.

The at least two write transducers 1002 are preferably positioned a predefined distance apart in a first direction 1004. Any predefined distance disclosed herein may be used. In some approaches, the predefined distance corresponds to a head span specified by a particular tape format such as LTO. The predefined distance may be selected by a user, a manufacturer, a service operator, a default setting, etc.

In one embodiment, the write transducers 1002 are secured to a support 1016 comprised of any stable material having a relatively low coefficient of thermal expansion (CTE) known in the art. For example, in a preferred embodiment, the stable material having a relatively low CTE is a nickel-iron alloy including, but not limited to, Invar (FeNi36), 64FeNi, etc. In one approach, at least two write transducers 1002 are coupled relative to one another by a support 1016 comprising Invar. In another approach, the stable material is a dielectric material such as a quartz.

The write transducers 1002 comprise write gaps 1006. The write gaps 1006 are defined between the pole tips of the write transducers. In some approaches, the outer surfaces of the pole tips of the write transducers 1002 are substantially coplanar. In a preferred embodiment, the planes 1008 of the write gaps 1006 are oriented substantially perpendicular to the first direction 1004. Furthermore, the outer surfaces 1010 of the write transducers 1002 from which the flux emanates are substantially coplanar. The planes of the write gaps 1006 are oriented substantially parallel to one another to less than 0.1 degrees of relative angle therebetween. In other approaches, a distance between the write gaps as measured in the first direction deviates by less than 5 nm as measured at any point therealong. In general, the lower the amount of deviation, the more accurate the results. Said another way, the more parallel the planes of deposition of the write gaps, the better. Any alignment technique may be adapted for use to align the write transducers according to any of the embodiments described herein as would be understood by one having ordinary skill in the art upon reading the present disclosure.

In preferred approaches, the predefined distance between the write gaps 1006 is set accurately to a specified (e.g., predetermined) value. In a preferred embodiment, the distance between the write gaps 1006 is set to 2859 microns. In various approaches, the distance may be within +/−50 nanometers of the predefined distance. In other approaches, the distance may be within 25 nm, 10 nm, 5 nm, etc. The write gaps 1006 are preferably aligned to within a few microns of one another in a cross track direction perpendicular to the first direction 1004. In preferred embodiments, the parallel planes extending in the first direction 1004 along respective centerlines of the write gaps 1006 are substantially coplanar.

In various embodiments described herein, "substantially planar" may refer to elements which are as planar as possible within manufacturer capabilities, as would be understood by one having ordinary skill in the art upon reading the present disclosure. Similarly, "coplanar" elements refer to elements which are ideally as coplanar as possible within manufacturer capabilities, as would be understood by one having ordinary skill in the art upon reading the present disclosure.

Those skilled in the art, armed with the present teachings, will appreciate that known methods of manufacturing the write transducers described herein may be adapted for use in constructing such write transducers. Moreover, unless otherwise specified, processes and materials of types known in the art may be adapted for use in various embodiments in conformance with the teachings herein, as would become apparent to one skilled in the art upon reading the present disclosure.

Referring again to FIG. 10, each write transducer 1002 of the apparatus 1000 comprises coils 1018 positioned to create flux in the respective magnetic yoke upon energization thereof. Any number of coils 1018 may be present in the apparatus 1000. The coils 1018 may be any type, shape, configuration, number, etc., known in the art. In various approaches, the apparatus 1000 comprises a circuit configured to energize the coils 1018, as would be understood by one having ordinary skill in the art.

In preferred embodiments, the apparatus 1000 comprises a mechanism 1020 for assisting in orienting a module 1012 having two or more sensors 1014 of interest relative to the write gaps 1006. As shown, the module 1012 to be characterized comprises at least two sensors 1014. The sensors 1014 of interest may be sensors of servo readers, sensors of the outer data readers, sensors positioned toward the center of a reader array, etc., or any other sensor known in the art.

The mechanism 1020 for assisting in orienting a module 1012 having two or more sensors 1014 of interest relative to the write gaps 1006 may include a motion circuit for causing the mechanism 1020 to translate the module 1012 in the first direction 1004. The mechanism 1020 may include any orienting mechanism known in the art. In an alternative embodiment, the apparatus may include a mechanism for assisting in orienting the write gaps of the write transducers relative to the module having two or more sensors for causing the mechanism to translate the write transducers in the first direction.

Figure 11A:
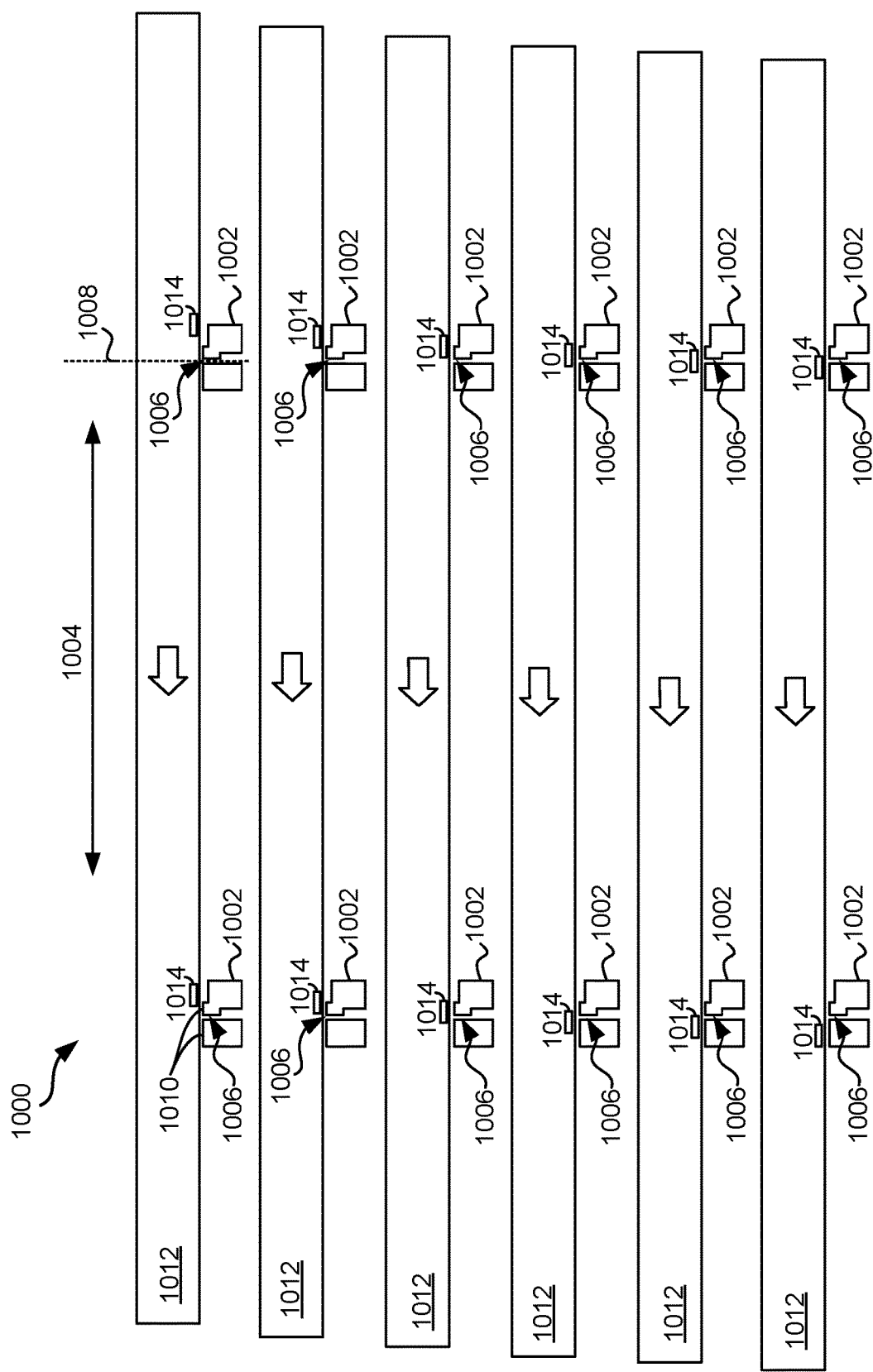
FIG. 11A is a representational diagram illustrating relative translation between a module and an apparatus, in accordance with one embodiment of the present invention.

As shown in FIG. 11A, the module 1012 having two or more sensors 1014 of interest translates parallel to the first direction 1004 relative to the write gaps 1006 such that each sensor 1014 traverses from one side of the write gap 1006 to the other side of the write gap 1006 for each of the write transducers 1002.

In one embodiment, the outer, media-facing surface of the module 1012 is brought into relatively close proximity to the outer surfaces 1010 of the write transducers 1002. The outer surface of the module 1012 is preferably oriented substantially parallel to the outer surfaces 1010 of the write transducers 1002.

The sensors 1014 of interest comprised in the module 1012 are aligned to the central portions of the write transducers 1002, e.g., with middles of the write gaps. In one embodiment, the module 1012 translates in the first direction 1004 and traverses a sequence of index positions.

As the module 1012 translates (e.g., as the sensors 1014 translate), a current is simultaneously applied to the aligned write transducers 1002. The current may be an AC current, a DC current, etc.

The apparatus 1000 preferably comprises a detection circuit 1013 for detecting a location of a change in resistance of each of the sensors 1014 during a relative translation between the module 1012 and the write transducers 1002 in the first direction 1004 for passing each sensor 1014 over a respective write transducer 1002. The detection circuit may be of known type. The detection circuit 1013 may be a chip, computer, ASIC, controller, etc. The detection circuit 1013 may be coupled to the sensors 1014 of the module 1012 via a cable 1017 or other known mechanism. In preferred approaches, detected changes in resistances of the sensors 1014 are a function of the relative position of the sensors 1014 to the write transducers 1002, and the relative locations at which the changes were detected may be used to characterize/determine a spacing between the sensors 1014.

In a preferred embodiment, apparatus 1000 comprises a computing circuit 1015 configured to characterize a spacing between the at least two sensors 1014 based on the detected changes in resistance of the sensors 1014 (to be described in further detail below, especially with reference to FIG. 12). The computing circuit 1015 may be a chip, computer, ASIC, controller, etc. The computing circuit 1015 may be coupled to the detection circuit 1013 in one approach. In another approach, the computing circuit 1015 may be integrated with the detection circuit 1013.

Figure 11B:
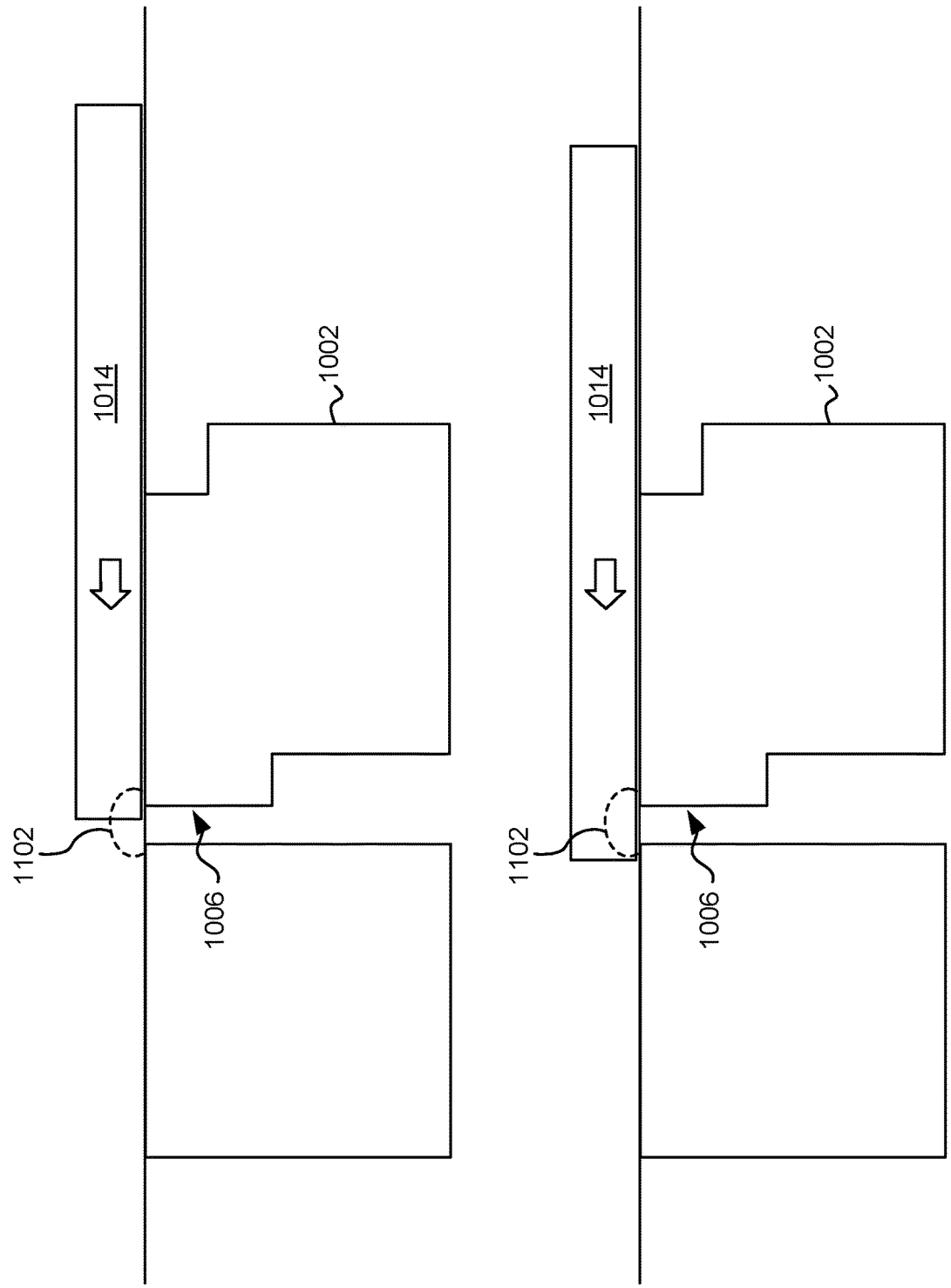
FIG. 11B illustrates a detailed view of the relative translation of FIG. 11A.

Referring briefly to FIG. 11B, a detailed view of the relative translation of a sensor 1014 over a write transducer 1002 of FIG. 10 is shown. As the sensor 1014 translates over the write transducer 1002 (specifically, the write gap 1006) a change in resistance occurs in the sensor 1014. The location at which the change in resistance occurs may be detected, recorded and/or stored in any manner known in the art. A representation of the magnetic flux bubble 1102 generated by the energization of the coils 1018 in apparatus 1000 is shown. As the sensor 1014 translates past the write transducer 1002 (specifically, the write gap 1006), the resistance returns to the nominal resistance of the sensor 1014. Referring again to FIG. 10, during the relative motion between the module 1012 and the apparatus 1000, the other sensor 1014 translates over a second write transducer (specifically, the write gap of a second write transducer) and the location of a second change in resistance may be detected, recorded and/or stored in any manner known in the art. In various approaches, the index positions associated with the changes in resistance of the sensors 1014 may be used in conjunction with the changes in sensor resistance to characterize the spacing of the sensors.

In other embodiments, it should be understood by one having ordinary skill in the art that an alternative approach may include translating the write transducers 1002 over the module 1012 having two or more sensors (e.g., the write transducers are translating, and the module having at least two sensors remains stationary during detection of changes in resistance, etc.). In yet other embodiments, both the write transducers 1002 and the module 1012 may move simultaneously to effect the relative movement.

Now referring again to FIG. 10, in various embodiments, a servo reader resistance for each servo reader sensor 1014 is recorded at each index position as the module 1012 traverses the write transducers 1002. Equivalently, a resistance for each of two (or more) data sensors 1014 is recorded at each index position as the module 1012 traverses the write transducers 1002. The translation may be oscillatory and the outputs of each sensor 1014 (or, equivalently, the change in resistance of the sensor 1014) may be characterized and/or captured by an oscilloscope.

In one embodiment, the apparatus 1000 comprises a temperature sensor in a vicinity of the write transducers 1002, e.g., coupled to a support 1016 for the write transducers. The computing circuit 1015 as described above is preferably configured to characterize the spacing using a correction factor that is based on a temperature of the support, the immediate vicinity of the sensor, the immediate vicinity of the write transducer, etc. For example, the correction factor may account for thermal expansion or contraction of the support. The correction factor may be obtained from a look up table of correction factors precalculated for various temperatures, calculated on the fly according to a predefined algorithm, etc.

Figure 12:
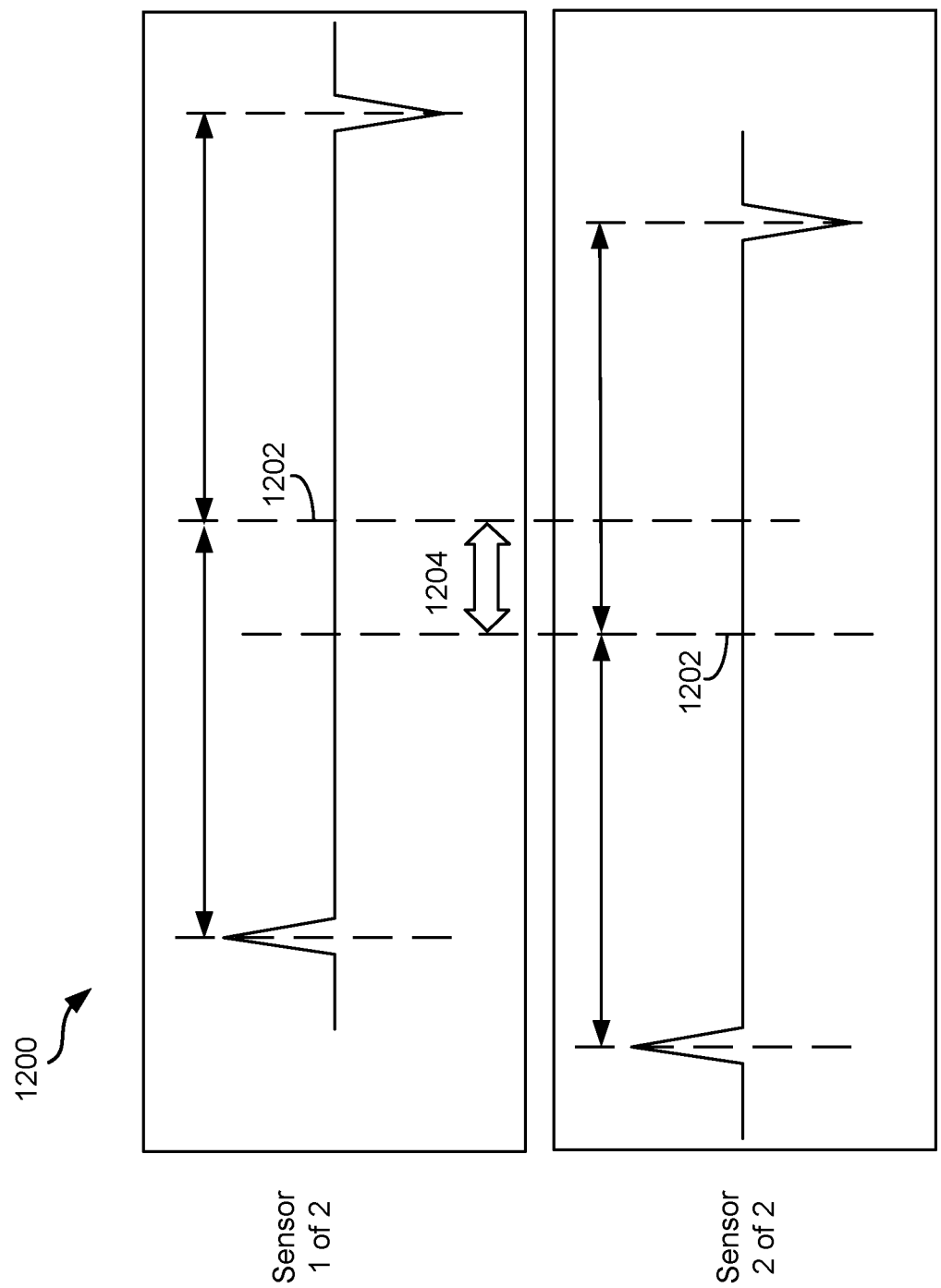
FIG. 12 is a chart depicting signal versus position output of the apparatus of FIG. 10.

FIG. 12 is a chart depicting signal versus position output 1200 of the apparatus of FIG. 10 in accordance with one embodiment. As an option, the present output 1200 may be implemented in conjunction with features from any other embodiment listed herein, such as those described with reference to the other FIGS. Of course, however, such output 1200 and others presented herein may be used in various applications and/or in permutations which may or may not be specifically described in the illustrative embodiments listed herein. Further, the output 1200 presented herein may be used in any desired environment.

As shown in this example, output 1200 includes the signal versus position outputs for a module having two sensors. The signal versus position output 1200 comprises a rising portion followed by a falling portion followed by a return to the nominal sensor resistance as a first sensor film enters the vicinity of the write gap. Once the first sensor has passed over the write gap, another falling portion is shown followed by a rising portion before the signal versus position output 1200 returns to the nominal sensor resistance as the sensor film leaves the write gap region.

Keeping in mind that in this example, two sensors are simultaneously moving across two write transducers as in the progression shown in FIG. 11A, the signal versus position output 1200 of FIG. 12 similarly comprises a rising portion followed by a falling portion followed by a return to the nominal sensor resistance as a second sensor film enters the vicinity of the write gap of the other write transducer. Once the second sensor has passed over the write gap, another falling portion is shown followed by a rising portion before the signal versus position output 1200 returns to the nominal sensor resistance as the sensor film leaves the write gap region.

In one embodiment, the spacing between the sensors is characterized by the distance between a front edge of the first sensor (derived from the change in resistance detected) and a front edge of the second sensor (derived from the change in resistance detected). In another embodiment, the spacing of the sensors is characterized by the distance between a back edge of the first sensor (derived from the change in resistance detected) and a back edge of the second sensor (derived from the change in resistance detected). In yet another embodiment, the spacing of the sensors is characterized by the distance from a first edge of the first sensor and a back edge of the second sensor, or vice versa. In another approach, the spacing of the sensors is characterized by the distance between centerlines for each of the sensors.

In a preferred embodiment, a centerline 1202 may be calculated and/or recorded for each sensor between the junctions of the respective rising and falling portions of the sensor output signal as shown.

In one embodiment, the difference 1204 between the centerlines 1202 of resultant positive and negative peaks for each sensor is a measure of dilation or contraction of the spacing between the sensors in the module (e.g., the head span). The difference 1204 between the centerlines 1202 may be correlated to a lookup table that provides a value for the actual spacing between the sensors.

In a preferred approach, a computing circuit is configured to characterize the spacing 1204 between at least two sensors based on detected changes in resistance of the sensors as they translate over write transducers as described above in view of any correction factor.

In one example, if the difference 1204 between the centerlines 1202 of resultant positive and negative peaks for each sensor is within a predefined threshold, the sensors may be determined to be within manufacturing specifications, ready for production, usable, etc. Any predefined threshold described herein may be set by a user, a manufacturer, a default setting, etc. Any predefined threshold may be found in a look-up table. In some approaches, the predefined threshold may be set for manufacturing specifications for determining whether a module is within the specifications. In another example, if the spacing 1204 between the centerlines 1202 of resultant positive and negative peaks for each sensor is equal to zero, the sensors may be determined to be within manufacturing specifications, ready for production, usable, etc.

Figure 13:
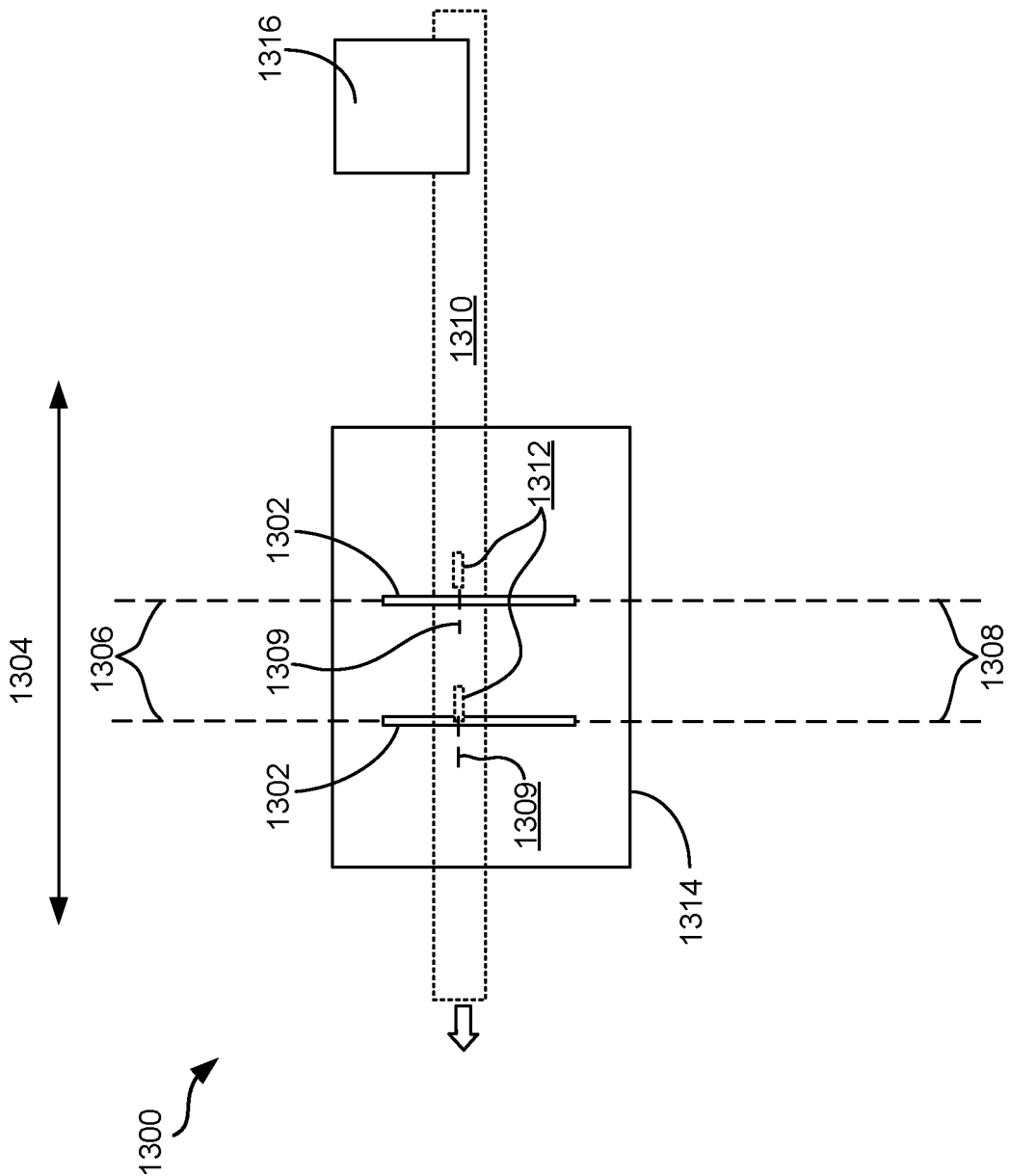
FIG. 13 is a representational diagram illustrating relative translation between a module and an apparatus, in accordance with one embodiment of the present invention.

FIG. 13 illustrates an apparatus 1300 and the relative translation between the apparatus 1300 and a module 1310, in accordance with one embodiment. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment.

In a preferred embodiment, the apparatus 1300 comprises at least two magnetic bars 1302 positioned a predefined distance apart in a first direction 1304. The predefined distance may be set by a user, a manufacturer, a service operator, a default setting, etc.

The magnetic bars 1302 may be any magnetic material such as iron (Fe), cobalt (Co), nickel (Ni), manganese (Mg), aluminum (Al), an iron-nickel alloy (NiFe), a cobalt-iron alloy (CoFe), etc. The magnetic bars 1302 may act as magnets and/or may be magnetized by energization of adjacent coils as would be understood by one having ordinary skill in the art. In various approaches, the at least two magnetic bars 1302 are formed on a single substrate. In other approaches, the at least two magnetic bars 1302 are on separate modules as shown in FIG. 13. A support 1314 as described elsewhere herein may be used to fix relative positions of the separate modules.

In preferred embodiments, an axis 1306 of each magnetic bar 1302 may be defined along an elongated outer surface thereof between distal ends of the respective bar. The axes 1306 of the magnetic bars 1302 are substantially perpendicular to the first direction. Furthermore, the axes 1306 of the magnetic bars 1302 are oriented substantially parallel to one another to less than 0.1 degrees of relative angle therebetween. In some approaches, a distance between the the magnetic bars 1302 as measured in the first direction deviates by less than 5 nm as measured at any point therealong. In general, the lower the amount of deviation, the more accurate the results. Said another way, the more parallel the planes of deposition of the write gaps, the better.

In preferred embodiments, the outer surfaces of the magnetic bars 1302 are substantially coplanar. Any alignment techniques known in the art may be used to align the magnetic bars 1302 according to any of the embodiments described herein as would be understood by one having ordinary skill in the art upon reading the present disclosure. For example, the modules in which the magnetic bars 1302 reside may be made coplanar by placing them on an optical flat in the proper relative positions and orientations and affixing them to a support 1314.

In one embodiment, the magnetic bars 1302 are secured to a support 1314 comprised of any stable material having a relatively low coefficient of thermal expansion (CTE) known in the art. For example, in a preferred embodiment, the stable material having a relatively low CTE is a nickel-iron alloy including, but not limited to, Invar, FeNi36, 64FeNi, etc. In one approach, at least two magnetic bars are coupled relative to one another by a support 1314 comprising Invar.

The magnetic bars 1302, and preferably the centerlines 1308 of the magnetic bars 1302, are positioned a predefined distance apart in a first direction 1304. Any predefined distance disclosed herein may be used. In some approaches, the predefined distance corresponds to a head span specified by a particular tape format such as LTO.

In preferred approaches, the predefined distance between the centerlines 1308 of the magnetic bars 1302 along the first direction is set to 2859 microns. In various approaches, the distance may be within +/−50 nanometers of the predefined distance.

The lateral centerlines 1309 of the magnetic bars 1302 along the first direction 1304 are preferably aligned within a few microns of one another in a cross track direction perpendicular to the first direction 1304. Specifically, in one embodiment, parallel planes extending in the first direction 1304 along respective lateral centerlines 1309 of the magnetic bars 1302 are spaced no more than 3 microns apart in a direction perpendicular to the first direction 1304. In preferred embodiments, the parallel planes extending in the first direction 1304 along respective centerlines 1309 of the magnetic bars 1302 are substantially coplanar.

In various embodiments described herein, "substantially planar" may refer to elements which are as planar as possible within manufacturer capabilities, as would be understood by one having ordinary skill in the art upon reading the present disclosure. Similarly, "coplanar" elements refer to elements which are ideally as coplanar as possible within manufacturer capabilities, as would be understood by one having ordinary skill in the art upon reading the present disclosure.

In one embodiment, the apparatus comprises a circuit configured to energize coils (not shown) proximate each of the magnetic bars for magnetizing the magnetic bars. Any number of coils may be present in the apparatus. The coils may be any type, shape, configuration, number, etc., known in the art. In various approaches, the apparatus comprises any circuit variation configured to energize the coils as would be understood by one having ordinary skill in the art.

The apparatus 1300 may comprise a mechanism 1316 for assisting in orienting a module 1310 having two or more sensors 1312 across the magnetic bars 1302 in the first direction 1304. As shown, the module 1310 to be characterized comprises at least two sensors 1312. The sensors 1312 of interest may be sensors of servo readers, sensors of the outer data readers, sensors positioned toward the center of a reader array, etc., or any other sensor known in the art.

The mechanism 1316 for assisting in orienting a module 1310 having two or more sensors 1312 of interest relative to the magnetic bars 1302 may include a motion circuit for causing the mechanism 1316 to translate the module 1310 in the first direction 1304. The mechanism 1316 may include any orienting mechanism known in the art. In an alternative embodiment, the apparatus may include a mechanism for assisting in orienting the magnetic bars relative to the module for causing the mechanism to translate the magnetic bars in the first direction.

The sensors 1312 of interest comprised in the module are aligned to the central portions (e.g., the centerlines 1309) of the magnetic bars 1302. In one embodiment, the module 1310 translates in the first direction 1304 and traverses a sequence of index positions.

As the module 1310 translates (e.g., as the sensors 1312 translate), the sensors 1312 are influenced by the magnetic field emanating from the magnetic bars 1302. If the magnetic bars 1302 are magnetized by a coil, a current is simultaneously applied to the coils. The current may be an AC current, a DC current, etc.

The apparatus 1300 preferably comprises a detection circuit for determining a location of a change in resistance of each of the sensors 1312 during a relative translation between the module 1310 and the magnetic bars 1302 in the first direction 1304 for passing each sensor 1312 over a respective magnetic bar 1302. In preferred approaches, detected changes in resistances of the sensors 1312 are a function of the index position and the detected changes may be used to characterize/determine a spacing between the sensors 1312.

In a preferred embodiment, apparatus 1300 comprises a computing circuit configured to characterize a spacing between the at least two sensors 1312 based on the detected changes in resistance of the sensors 1312. The spacing may be characterized according to any of the embodiments described above.

In various embodiments, a servo reader resistance for each servo reader is recorded at each index position as the module 1310 traverses the magnetic bars 1302. Equivalently, a sensor resistance for each data sensor 1312 is recorded at each index position as the module 1310 traverses the magnetic bars 1302. The translation may be oscillatory and the outputs of the sensor 1312 (or, equivalently, the change is resistance of the sensor 1312) may be characterized and/or captured by an oscilloscope.

In accordance with other embodiments, it should be understood by one having ordinary skill in the art that an alternative approach may include translating the magnetic bars over the module having two or more sensors (e.g., the magnetic bars are translating, and the module having at least two sensors remains stationary during detection of changes in resistance, etc.).

In one embodiment, the apparatus 1300 comprises a temperature sensor coupled to a support 1314 for the magnetic bars 1302. The computing circuit may be as described elsewhere herein, and is preferably configured to characterize the spacing using a correction factor that is based on a temperature of the support. For example, the correction factor may account for thermal expansion or contraction of the support. The correction factor may be obtained from a table of correction factors precalculated for various temperatures, calculated on the fly according to a predefined algorithm, etc.

The signal versus position output of a module have two or more sensors for apparatus 1300 may be recorded, calculated, stored, etc., according to any of the embodiments described with reference to FIG. 12.

In one exemplary embodiment, an apparatus may comprise a planar write head structure comprised of planar write transducers positioned with extremely precise alignment in all coordinates, e.g., planarity, in an x-axis direction, in a y-direction, etc. The extremely precise alignment of the write transducers preferably means the writers are as aligned as closely as possible in view of photolithography and/or other alignment techniques known in the art. Any known planar write head structure design may be used.

In one embodiment, the write transducers are fabricated on an aluminum-titanium carbon (AlTiC) head wafer using standard magnetic head fabrication processes known in the art. The CTE of AlTiC is approximately 7.8 ppm/C. In one embodiment, the AlTiC wafer portion has a temperature sensor for correcting span information determined therefrom. In operation, the apparatus may be located in a temperature regulated environment. In this approach, the read module support may comprise an outrigger for establishing parallelism between the outer surface of the read module and the planar surface of the write transducer wafer.

In various embodiments described herein, a precision stage may translate the reader module (e.g., the module having two or more sensors of interest). In one exemplary embodiment, the precision stage is the PI N-565 Linear Stage (PI, 16 Albert Street, Auburn, Mass. 01501, USA). In preferred embodiments, the precision stage has nanometer precision.

In another embodiment, an AlTiC wafer or any other substrate may comprise permanently magnetized bars (e.g., such as those described above with reference to FIG. 13). The permanently magnetized bars may be photolithographically deposited thereon using any technique known in the art. The magnetized bars provide the magnetic flux for determining magnetic spacing of readers in a read module. Permanently magnetized bars do not require energizing although an apparatus described herein may comprise various coils known in the art.

Figure 14:
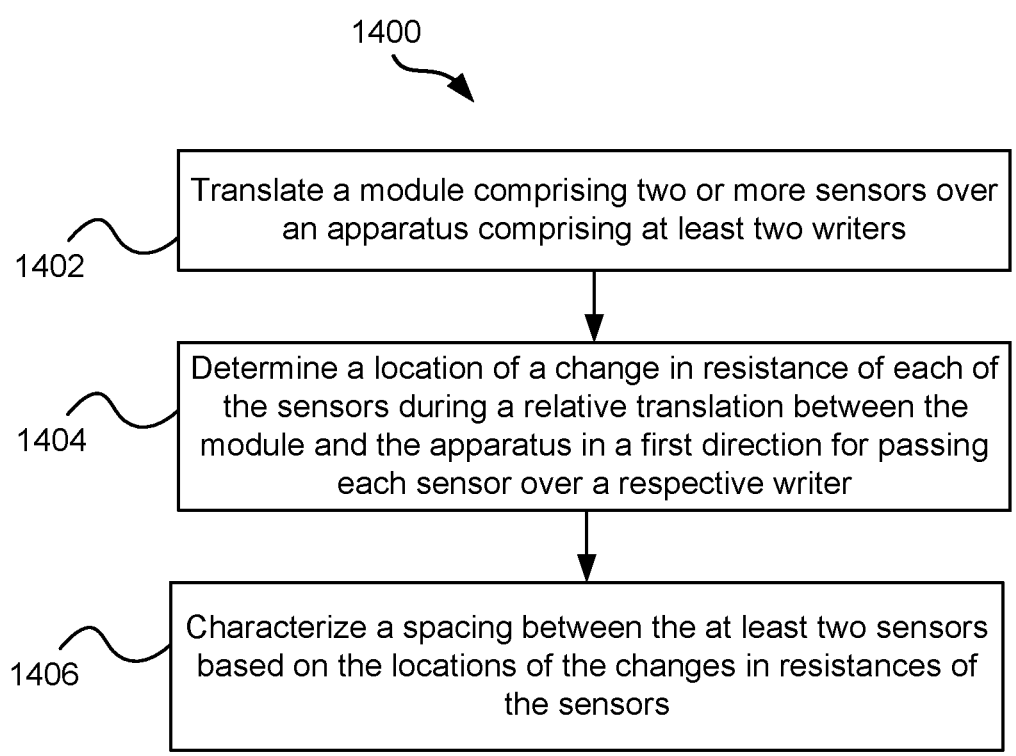
FIG. 14 is a flowchart of a method, in accordance with one embodiment of the present invention.

Now referring to FIG. 14, a flowchart of a method 1400 is shown according to one embodiment. The method 1400 may be performed in accordance with the present invention in any of the environments depicted in FIGS. 1-13, among others, in various embodiments. Of course, more or fewer operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, method 1400 includes operation 1402, translating a module comprising two or more sensors over an apparatus comprising at least two write transducers in a first direction. The apparatus may be any of the apparatuses described in detail above for characterizing the spacing between the at least two sensors. For example, the at least two write transducers may be interchangeable with magnetized bars as described above. It should be understood by one having ordinary skill in the art that in alternative approaches the apparatus comprising at least two write transducers may be translated over the module comprising two or more sensors in a first direction.

Operation 1404 includes determining a location of a change in resistance of each of the sensors during a relative translation between the module and the apparatus in the first direction for passing each sensor over a respective write transducer. The location of the change in resistance, e.g., an index position of the module corresponding to the change in resistance, may be detected, recorded and/or stored in any manner known in the art.

Operation 1406 includes characterizing a spacing between the at least two sensors based on the respective locations of the changes in resistances of the sensors. The spacing between the at least two sensors may be characterized according to any of the embodiments described in detail above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    at least two write transducers positioned a predefined distance apart in a first direction,
        wherein outer surfaces of pole tips of the write transducers are substantially coplanar;
        wherein write gaps are defined between the pole tips of the write transducers,
        wherein planes of the write gaps are oriented substantially perpendicular to the first direction,
        coils positioned to create flux in a magnetic yoke of each write transducer upon energization thereof;
    a mechanism for assisting in orienting a module having two or more sensors of interest relative to the write gaps; and
    a detection circuit for detecting a location of a change in resistance of each of the sensors during a relative translation between the module and the write transducers in the first direction for passing each sensor over a respective write transducer.

2. An apparatus as recited in claim 1, comprising a circuit configured to energize the coils.

3. An apparatus as recited in claim 1, comprising a computing circuit configured to characterize a spacing between the sensors based on the detected locations of the changes in resistance of the sensors.

4. An apparatus as recited in claim 3, comprising a temperature sensor coupled to a support for the write transducers, wherein the computing circuit is configured to characterize the spacing using a correction factor that is based on a temperature of the support.

5. An apparatus as recited in claim 1, comprising a motion circuit for causing the mechanism to translate the module in the first direction.

6. An apparatus as recited in claim 1, wherein the at least two write transducers are coupled relative to one another by a support comprising a nickel-iron alloy material.

7. An apparatus as recited in claim 1, wherein the at least two write transducers are coupled relative to one another by a support comprising a quartz.

8. An apparatus as recited in claim 1, wherein the write transducers are on separate modules.

9. An apparatus as recited in claim 1, wherein the write transducers are formed on a single substrate.

10. An apparatus as recited in claim 9, wherein the write transducers are planar write transducers.

11. An apparatus, comprising:
    at least two magnetic bars positioned a predefined distance apart in a first direction, an axis of each magnetic bar being defined along an elongated outer surface thereof between distal ends of the respective magnetic bar,
        wherein outer surfaces of the magnetic bars are substantially coplanar;
        wherein axes of the magnetic bars are oriented substantially perpendicular to the first direction;
    a mechanism for assisting in orienting a module having two or more sensors across the magnetic bars in the first direction; and
    a motion circuit for causing the mechanism to translate the module in the first direction.

12. An apparatus as recited in claim 11, comprising a circuit configured to energize coils adjacent each of the magnetic bars for magnetizing said bars.

13. An apparatus as recited in claim 11, comprising a detection circuit for detecting a location of a change in resistance of each of the sensors during a relative translation between the module and the magnetic bars in the first direction for passing each sensor over a respective magnetic bar.

14. An apparatus as recited in claim 13, comprising a computing circuit configured to characterize a spacing between the sensors based on the detected locations of changes in resistance of the sensors.

15. An apparatus as recited in claim 14, comprising a temperature sensor coupled to a support for the magnetic bars, wherein the computing circuit is configured to characterize the spacing using a correction factor that is based on a temperature of the support.

16. An apparatus as recited in claim 11, wherein the at least two magnetic bars are coupled relative to one another by a support comprising a nickel-iron alloy material.

17. An apparatus as recited in claim 11, wherein the magnetic bars are formed on a single substrate.

18. An apparatus, comprising:
   at least two magnetic bars positioned a predefined distance apart in a first direction, an axis of each magnetic bar being defined along an elongated outer surface thereof between distal ends of the respective magnetic bar,
      wherein outer surfaces of the magnetic bars are substantially coplanar;
      wherein axes of the magnetic bars are oriented substantially perpendicular to the first direction; and
      a mechanism for assisting in orienting a module having two or more sensors across the magnetic bars in the first direction,
      wherein the magnetic bars are on separate modules.

19. An apparatus as recited in claim 18, comprising a detection circuit for detecting a location of a change in resistance of each of the sensors during a relative translation between the module and the magnetic bars in the first direction for passing each sensor over a respective magnetic bar.

* * * * *